United States Patent [19]

Metheny

[11] 4,167,838
[45] Sep. 18, 1979

[54] PORTABLE BUILDINGS

[76] Inventor: Darrell H. Metheny, 12031 Beach Blvd., Stanton, Calif. 90680

[21] Appl. No.: 611,207

[22] Filed: Sep. 8, 1975

[51] Int. Cl.² .......................... E04H 1/12; E04H 9/06
[52] U.S. Cl. .................................... 52/79.5; 52/57; 52/79.9; 52/90; 52/262; 52/584
[58] Field of Search ............... 52/664, 585, 669, 100, 52/467, 66, 745, 71, 747, 63, 758 H, 79, 64, 584, 57, 90, 262, 624; 47/17; 46/19, 12, 21; 403/346, 347

[56] References Cited

U.S. PATENT DOCUMENTS

| | | | |
|---|---|---|---|
| 548,998 | 10/1895 | Mannesmann | 403/346 X |
| 1,596,950 | 8/1926 | Semonin | 52/758 H |
| 1,661,482 | 3/1928 | Kuhne | 52/64 |
| 1,724,601 | 8/1929 | Kellogg | 52/467 X |
| 1,845,861 | 2/1932 | Anderson | 52/71 |
| 2,076,728 | 4/1937 | Keller | 52/100 X |
| 2,101,707 | 12/1937 | Ewing | 52/669 X |
| 2,185,904 | 1/1940 | Stowe | 52/758 H X |
| 2,241,266 | 5/1941 | Mayne et al. | 52/758 H X |
| 2,793,401 | 5/1957 | Paschke | 52/64 X |
| 2,849,758 | 9/1958 | Plumley et al. | 52/585 X |
| 2,854,705 | 10/1958 | McClaran | 52/262 X |
| 2,956,315 | 10/1960 | Lipp et al. | 52/624 X |
| 2,963,122 | 12/1960 | Jagemann | 52/90 X |
| 2,978,531 | 4/1961 | Appleman | 52/467 X |
| 3,222,841 | 12/1965 | Lipof | 52/63 X |
| 3,497,245 | 2/1970 | Metzger | 403/347 X |

FOREIGN PATENT DOCUMENTS

| | | | |
|---|---|---|---|
| 705424 | 6/1931 | France | 403/347 |
| 944679 | 4/1949 | France | 52/664 |
| 1399355 | 4/1965 | France | 403/347 |
| 419083 | 3/1947 | Italy | 52/664 |

Primary Examiner—Leslie Braun
Attorney, Agent, or Firm—Grover A. Frater

[57] ABSTRACT

A building suitable for use as a greenhouse within which to conduct hydroponic gardening is formed by a pair of side walls and a pair of end walls each of which is provided with a peripheral frame. It is covered by a roof that also has a peripheral frame that fits within the upper portions of the frames of the several sides. The roof is covered with a sheeting material which extends beyond the margins of the frame and is resilient whereby those resilient extensions rest upon the upper portion of the frame of the several sides in assembled condition and form a seal between the roof and sides. Similar extensions of sheeting beyond the peripheral frame of the sides provides sealing at the vertical corners of the building. The sides and roof are secured together by fasteners that can be selectively fastened and unfastened from the interior of the structure permitting complete dissembly and reassembly of the building at will. The frame members, and cross members of the frame, are formed of light gauge rectangular tubing. The end of one member extends into or through the other at their points of junction and intersection. Blocks of wood or other relatively soft material are inserted into the tubing at points which require added strength. The entire building is covered with sheeting, advantageously fiberglass. The sheeting is held in place by battens which overlie the sheeting and the frame members and are fastened through the sheeting to the frame members.

1 Claim, 10 Drawing Figures

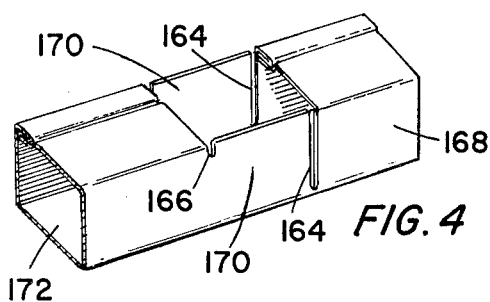
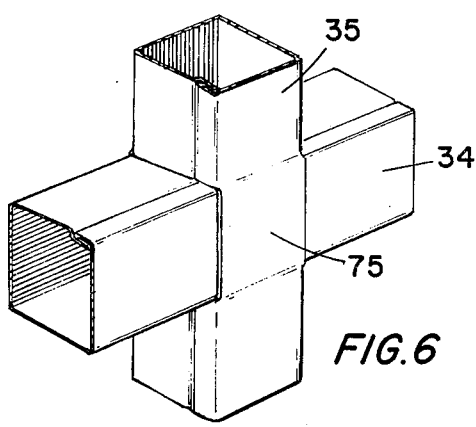
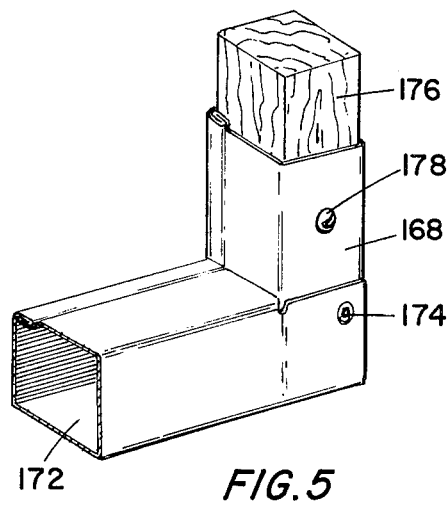
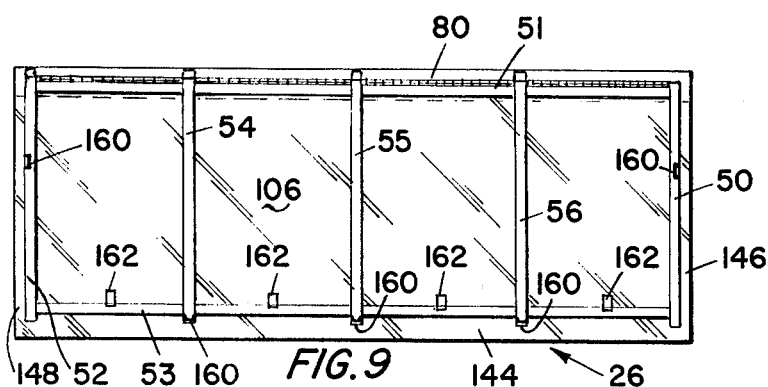
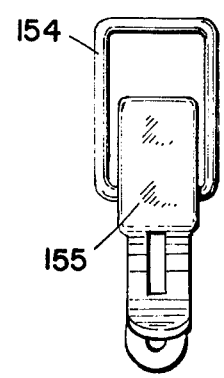
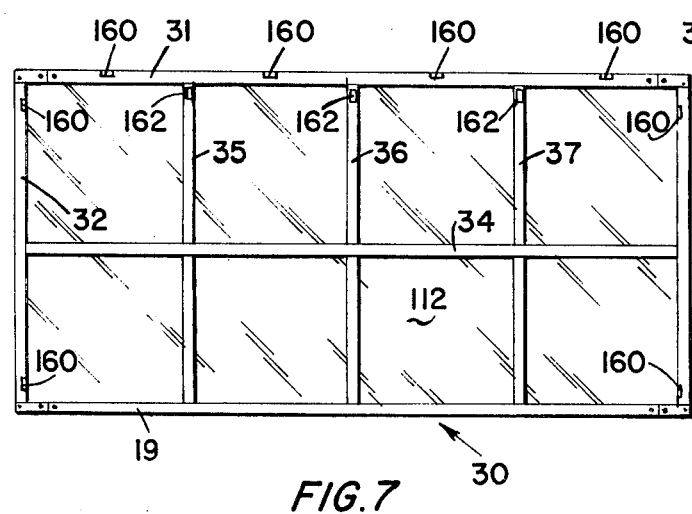
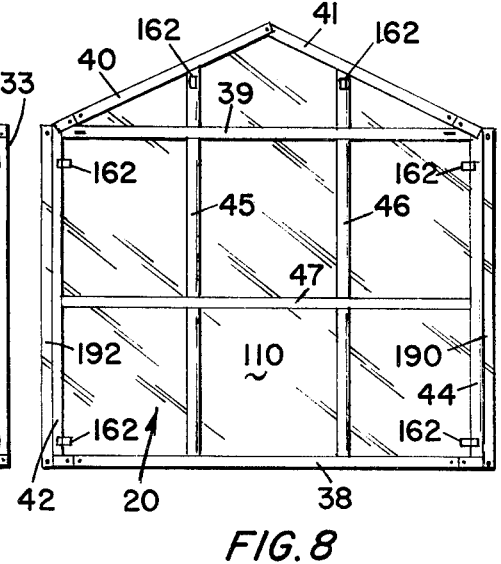

PORTABLE BUILDINGS

BACKGROUND OF THE INVENTION

This invention relates to improved portable buildings and to methods of making the same. It relates particularly to portable buildings which are suitable as greenhouses and the walls and roof of which may be assembled and dissembled with ease. While not limited thereto, the invention relates to a portable building which is particularly suitable for housing hydroponic gardens.

Most greenhouses are rectangularly shaped structures formed by two side walls adjoined by two peaked end walls and covered with a peaked roof of the kind that has a straight ridge line extending over the length of the building. The frame is covered with glass or plastic material that is either transparent or transluscent. Some of those greenhouses are portable in the sense that they are sufficiently small, and small sufficiently lightweight so that the frame, and in the case of plastic frame the entire building, can be picked up and moved bodily from place to place. Other greenhouses are portable in the sense that the walls and roof are divided into prefabricated panels that can be moved to a job site and there erected and fastened together with nails or bolts whereupon portability is lost.

Those greenhouses that are intended to house hydroponic gardens must be watertight and substantially airtight. Hydroponic gardening utilizes an entirely controlled environment. A number of greenhouse designs satisfy the requirement of being air and watertight, but it appears that no prior greenhouse has been constructed in a way that achieves airtightness and watertightness without the use of fastening arrangements that substantially end any portability, and that certainly do not permit easy dissembly and reassembly of the building.

SUMMARY OF THE INVENTION

It is an object of this invention to provide a building structure which provides a building suitable as a greenhouse for hydroponic gardening and which, nonetheless, is easily dissembled and reassembled.

It is an object of the invention to provide a greenhouse which is suitable for the conduct of hydroponic gardening and which can be entirely dissembled and removed from its founddation periodically, as at the end of a growing season. That feature permits complete cleaning of the building at ground level without any need to work overhead. It permits cleaning of the foundation including that portion that underlies the walls of the buidling. It enables erecting the tanks and pumps and furniture, and other components, of a hydroponic garden on the foundation without any need to pass through a greenhouse door whereby the size of the components and furniture is not limited by door size and the work of constructing, or reconstructing, the garden need not be conducted within the confines of the greenhouse walls or any need to use precaution against piercing or breaking its light panels.

A further object is to accomplish that kind of protability and assembly and dissembly facility using materials and techniques that are less costly than those that have been applied in prior art- and watertight buildings.

These and other objects and advantages of the invention which will hereinafter appear are realized, in part, by the use of a construction in which the building is divided into end panels and wall panels and roof panels which are provided with marginal frames. The marginal frame of the roof is made to fit inside of the upper members of the frames of the several walls. The roof is covered with a sheeting material the margins of which extend beyond the roof frame and which rest upon the upper members of the wall frames when the building is assembled. In preferred form, those margins of the roof that extend beyond its frame are made of a resilient material which can be drawn against the upper margins of the walls whereby to form an inexpensive but effective seal between roof and walls.

In the preferred embodiment, that same technique is used at the vertical corners where the side walls join the end walls. The resilient sheeting is extended beyond the frame so that it overlies the frame member of the adjacent wall panel. That can be done by extending the sheeting at one end of every panel, but in preferred form, the sheeting is extended beyond the frame at both sides of both of the walls of a pair. That is, it is extended beyond the frame at both sides of each end wall or at both sides of each side wall. In either event, the frame of the side that is provided with the sheeting extension is fitted within the frames of the other pair of side walls.

The frames are provided with cross members that divide the several walls into individual panels. The sheeting material is secured to the frame by battens which overlie the peripheral frame and the cross members of the frame of each wall. Rigidity and long-term dimensional uniformity are accomplished by using rectangular tubing for the frame members. A very thin-walled tubing is all that is required and that is desired. Rectangular cutouts at the inner side of the peripheral frame receive the ends of the cross members. At the intersection of cross members juxtaposed rectangular portions of the opposite sides of the rectangular tube are removed. The remaining walls are expanded slightly and one tube is inserted through the juxtaposed rectangular opening so that it extends directly through the other. Blocks of wood or other solid and relatively soft material are inserted within the rectangular tubing at those points at which the battens are fastened to the tubing so that the fastening element can be secured to the plug as well. Rigidity is further enhanced by forming frame corners such that at least one wall of the rectangular tubing that forms the frame is continuous around the corner. That is accomplished by notching one side of the rectangular frame and bending the tube at right angles at that point. Wooden plugs inserted partially in one end of one rectangular tube and partially into the end of a second rectangular tube permit the two tubes to be joined in abuttment.

The side walls are held to one another and to the roof by a plurality of fastening elements which can be selectively fastened and unfastened. One part of a fastening element is fixed to the interior side of one panel of the construction while the other section of the same fastener is fixed to the interior side of an adjacent panel. All of the fasteners are accessible from the interior of the building, and in preferred form, they are manually operated so that no tools are required to fasten the elements of the building to one another or to unfasten them. Buildings as large as 16'×24', and larger, are constructed using lightweight aluminum tubing which is rectangular in cross-section and measures approximately $1\frac{1}{4}$" on the side. In preferred form, the fasteners comprise a hook-and-bail combination in which one of the hook or bail is spring biased and one of them is actuated by a toggle mechanism.

THE DRAWINGS

In the drawings:

FIG. 4 shows a fragment, drawn in isometric view, of a portion of a frame member notched prior to being folded to form a corner;

FIG. 5 is an isometric view of a fragment of a frame that includes a corner;

FIG. 6 is a fragment of a frame that shows an intersection of two cross bars;

FIGS. 7, 8 and 9 are schematic drawings of a side wall panel, an end wall panel, and a roof panel, respectively, showing the location of the parts of the fasteners by which those panels are interconnected; and FIG. 10 is a top plan view of one part of a preferred form of fastener element.

DESCRIPTION OF THE PREFERRED EMBODIMENT

Figure 1:
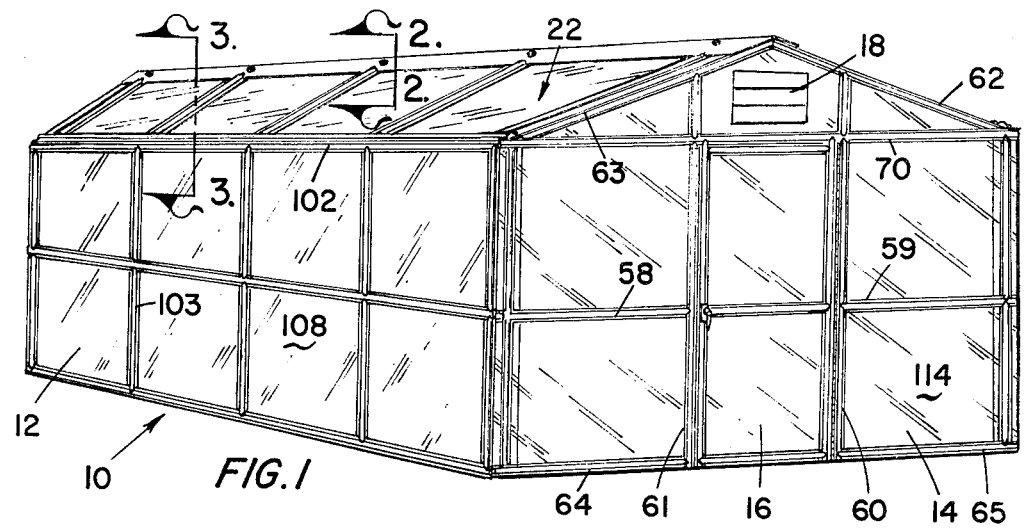
FIG. 1 is an isometric view of a completely assembled portable building which embodies the invention and is made according to the method of the invention.

In FIG. 1, the structure 10 is a greenhouse comprising a pair of side walls one of which, number 12, is visible. There are two end walls which are alike except that one of them is formed with a door opening and door and has a gravity-closed, air vent mounted in the sub panel above the door opening. That front end panel is generally designated 14. The door 16 is located in the central portion of the front end. The air outlet is numbered 18. The rear end wall panel is not visible in FIG. 1, but it is shown schematically in FIG. 8.

Returning to FIG. 1, the roof, which is generally designated 22, is divided into two panels. One of them is visible in FIG. 1 where it is designated by the reference numeral 24. The other is visible in the cross-sectional view of FIG. 2 and in FIG. 9 where it is generally designated 26. The side wall opposite side wall 12 is visible in FIG. 7 where it is designated by the reference numeral 30.

The building shown in FIG. 1 is approximately 8 feet wide across the front and rear wall panels. It is 12 feet long. The side walls are 6 feet high and the center of the ridge cap is approximately 2 feet above the level of the top of the wall.

The end walls and the side walls are divided into sub-panels by cross members. Each of the two roof panels is divided into sub-panels by cross members that extend in the direction perpendicular to the ridge line. Those cross members serve as rafters.

Each panel of the building is formed with a frame that extends around its periphery. That is best shown in FIGS. 7, 8 and 9. In FIG. 7, the upper segment of the frame is designated 31. It serves as the upper plate. At the other side of the panel, the member 19 serves as the lower plate. The member 32 at the left serves as the upright at one end and the member 33 at the right serves as the other upright to complete the peripheral frame. The cross member 34 is located midway between midway plates 31 and 19 and extends parallel to them. The three upright cross members, 35, 36 and 37, are arranged to form equal spaces along the length of the side.

In FIG. 8, the lower member 38 is a plate. The upper cross member 39 is a stringer. Members 40 and 41 are plate members rather than rafters. They are not fixed to the roof panels. Uprights 42 and 44 form the left and right sides of the peripheral frame which is completed by the plate 38 and plate members 40 and 41. There are two upright cross members, 45 and 46, which are spaced to divide the rear end wall 20 into three equal vertical sections. The cross member 47 extends horizontally midway between the lower plate 38 and the stringer 39.

The peripheral frame of the roof panel shown in FIG. 9 is formed by rafter 50 at the right, ridge beam 51 at the upper part of FIG. 9, rafter 52 at the left, and an eave beam 53 at the lower part of FIG. 9. There are three additional rafters designated 54, 55, and 56, respectively, which interconnect the ridge beam 51 and eave beam 53. They are spaced to divide the roof panel into four sub-panels of substantially equal size.

The other roof panel 22 is substantially like the roof panel shown in FIG. 9. The other side wall panel 12 is substantially like side wall panel 30 shown in FIG. 7. The front end wall panel is similar to the rear end wall panel 20 shown in FIG. 8, with the exception that the cross bar 47 of FIG. 8 has been replaced by a pair of cross bars 58 at the left and 59 at the right of the door 16. The two upright cross members 60 and 61 of the front panel extend from the plate members 62 and 63, respectively, of the front panel down to the lower plate. The lower plate is divided into two sections, 64 and 65, in FIG. 1. In the design shown there is no plate member or threshold under the door. The construction is sufficiently rigid so that no plate or threshhold is required. Except for the stringer 39 in the rear end wall shown in FIG. 8, and the stringer 70 of the front end wall panel, the building includes no stringers.

In the preferred form of the invention, the frame is constructed entirely of rectangular metal tubing. Aluminum tubing is preferred because of the ease with which it is protected against corrosion and because it is easily cut and worked to permit insertion of the end of a piece of the tubing into or through another piece of the tubing, notwithstanding that they are formed with the same original cross-sectional dimensions. The manner in which the tubing is made to intersect is best illustrated in FIG. 6 which shows fragments of the cross members 34 and 35 of FIG. 7 at their intersection. Juxtaposed areas of opposite sides of member 35 are cut away. The cut away areas are shaped to conform to the cross-sectional shape of the rectangular tubing. An expanding tool is inserted through the cutouts of the member 35 so that the wall sections that bridge the cutout are expanded sufficiently to permit the member 34 to be received through the member 35, notwithstanding that the cross-sectional areas of those members was originally the same. For identification, one of the sides of member 35 that bridges the cutouts and has been expanded and is visible in FIG. 6 is designated by the reference numeral 75. Similar intersections are found at the intersection of members 54, 55 and 56 with members 53 and 51 in FIG. 9. Similar intersections are found at the junction of member 34 and members 36 and 37 in FIG. 7, and at the junction of members 39 and 47 with uprights 45 and 46 in FIG. 8. Several of those intersections may also be seen in FIGS. 2 and 3. Thus, the intersection of members 55 and 51 is visible at the right in FIG. 2. At the left, the intersection of the corresponding rafter 76 and the other ridge beam 77 is shown.

Figure 2:
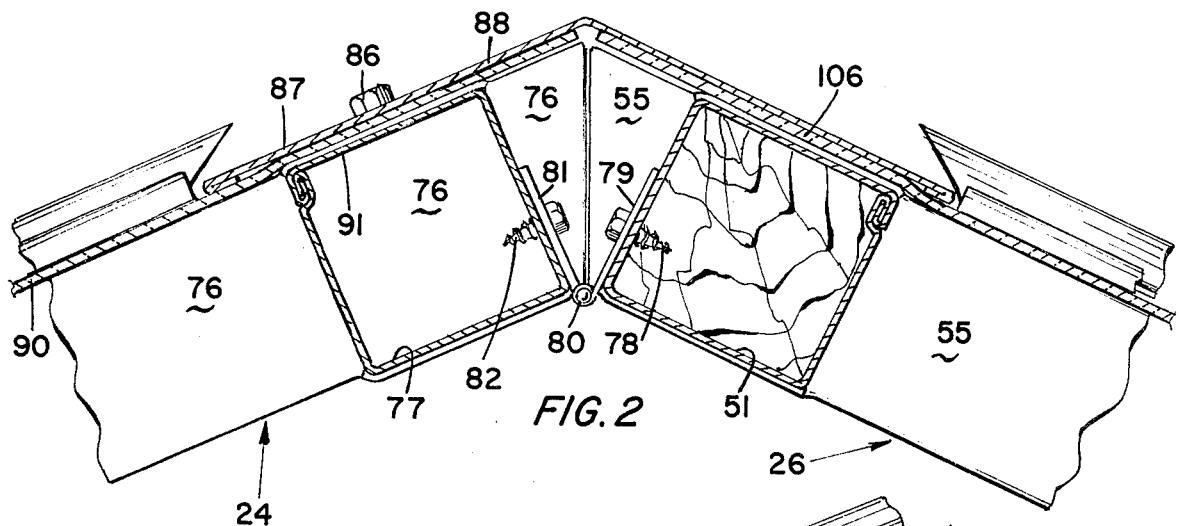
FIG. 2 is a cross-sectional view taken on line 2—2 of FIG. 1.

In FIG. 2, the member 51 is shown to contain a block of wood into which a screw 78 is fastened. That screw secures one side 79 of a piano-type hinge 80 to the ridge line side of the ridge beam 51. Returning to FIG. 9, it will be apparent that the piano hinge is divided into four sections of which section 80 is only one. The other side of piano hinge 80, designated 81, is fastened by a screw 82 to the ridge line side of the ridge beam 77. That ridge beam includes a wooden block at the point at which the screw 82 is fastened. However, it has been omitted for the sake of clarity so that it will be apparent that what is visible in that ridge beam is part of the side wall of the rafter 76. The screw 86 extends through one side 87 of the inverted V-shaped ridge cap 88. It also extends through the layer of sheeting 90 which overlies the roof frame panel 24. The screw further extends through bridging wall 91 of rafter 76 and through the upper wall of ridge beam 77 into the interior of rafter 76 where it is screwed into a wooden block, not visible in the drawings.

Figure 3:
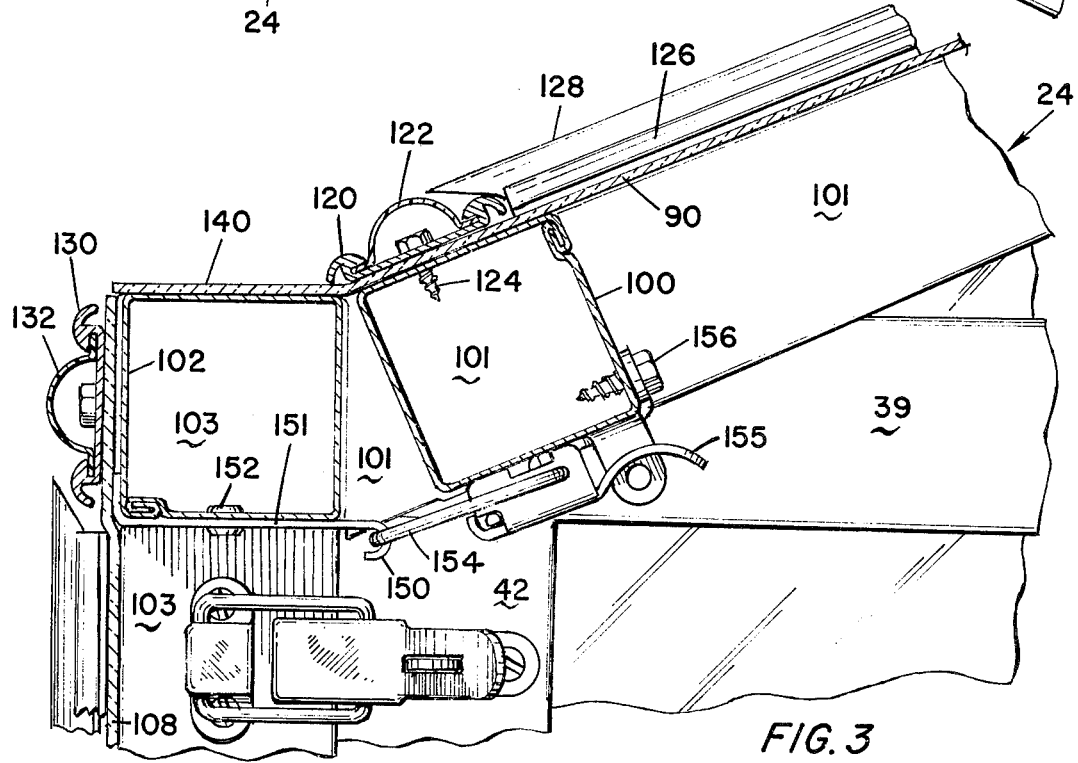
FIG. 3 is a cross-sectional view taken on line 3—3 of FIG. 1.

It is for a similar reason that the block of wood is omitted from the interior of eave beam 100 in FIG. 3. The rafter 101 of roof panel 24 is seen to extend through the beam 101. In FIG. 3, the member 39 is the stringer that is visible in FIG. 8, and the member 42 is the upright that is visible in FIG. 8. The member 102 in FIG. 3 is the upper plate of wall panel 12. It corresponds to member 31 in FIG. 7. Member 103 in FIG. 3 is the cross member 103 of panel 10 of FIG. 1. It corresponds to upright 35 of the opposite wall section shown in FIG. 7. The lower wall of plate 102 has had a rectangular section cut away of size to accommodate the upper end of cross member 103, and that upper end has been inserted into that opening so that it is visible when looking into the end of plate 102 shown in FIG. 3. In similar fashion, the lower end of cross member 103 is inserted into an opening in the lower plate of the wall panel 12. That construction is repeated at each junction of a cross member with a plate or an upright.

Each panel is covered with a layer of sheeting. In the case of roof panel 34, that sheeting was designated by the reference numeral 90. The sheeting that covers roof panel 26 is designated 106. The sheeting that covers the side panel 12 is designated 108. The sheeting that covers the rear wall section is designated 110, and the sheeting that covers the wall panel 30 is designated 112. In the front wall panel, the sheeting that covers the front panel, except for the door, is designated 114. All of that sheeting, including the sheeting on the door, is held in place with battens that are generally coextensive with and overlying the frame members. They overlie both the frame members and the sheeting and they are held in place by fastening element, machine screws in the preferred case, that extend through the battens and the sheeting into the frame member below and the plug, if any, within the frame member.

The general arrangement of the battens is shown in FIG. 1. The specific construction of the battens is shown in FIGS. 2 and 3. They are shown in cross-section and in side elevation in FIG. 3. In this embodiment, the batten comprises two parts. One is a generally channeled shaped extrusion having a flat lower side. That is the batten, per se. A plastic strip which is generally dome shaped in cross-section interfits with the metal extrusion and serves as a trim piece to hide the heads of the screws by which the batten is fixed to the sheeting and the frame member. In FIG. 3, the batten 120 and its plastic covering 122 extend parallel to the eave beam 100 and are fastened to that beam by screws, one of which is shown and designated 124. Another batten 126 and its plastic covering 128 are shown to extend along and over the rafter 101. The lower end of the plastic strip 128 is trimmed at an angle to enhance the appearance of the intersection of the plastic sheath 128 and the plastic 122. A similar construction is shown at the left side of FIG. 3 where the batten 130 and its plastic sheath 132 secure the upper edge of sheeting layer 108 to the plate 102. Those battens are effective to seal the sheeting against the frame.

The layer of sheeting 90 on roof panel 24 includes a portion 140 which extends beyond eave beam 100 of the peripheral frame of the roof section. At least section 140 is made of a resilient material. In this embodiment, the sheeting 90 is made of fiberglass so that all of it is resilient. In its relaxed condition, the condition that it has when the roof is removed from the remainder of the structure, the extension 140 of the sheeting would lie in the same plane as the remainder of the sheeting 90. That is true around the entire margin of the roof. Turning to FIG. 9, the margin 144 at the bottom of FIG. 9, the margin 146 at the right in FIG. 9 and the margin 148 at the left in FIG. 9 are all formed of resilient material, and, in fact, they are simply extensions of the resilient sheeting layer 106. In relaxed condition, those margins lie in the same plane as the remainder of the sheeting layer.

A comparison of FIGS. 7 and 9, and an examination of FIG. 3, will make it apparent that the peripheral frame of the roof fits inside of the upper members of the peripheral frames of the several side sections. However, the peripheral portions of the roof sheeting lie atop the upper member of each of the roof sections. For example, in FIG. 3, the marginal section 140 of sheeting 90 lies atop frame member 102. When assembled, the marginal portion 148 of sheet 106 in FIG. 9 will lie atop plate member 41 in FIG. 8. A marginal portion of sheeting 106 will lie atop plate 31 of FIG. 7, and the margin 146 of sheet 106 will lie atop plate 62 in FIG. 1. The weight of the roof tends to force those margins against the upper frame members of the walls so that those sheeting margins are in sealing engagement with the frame members.

To insure a good seal, the roof is fastened or buckled down to the side walls by a fastening means, a preferred form of which is shown in FIG. 3. It comprises a hook 150 whose shank 151 is fixed by a rivet 152 to the plate member 102. The other element of the fastener is a bail 154 which is connected to a toggle mechanism 155 which is fastened by screw 156 to the eave beam 100 of the roof frame. Both parts of that fastener are on the inside of the building and both of them are accessible from the interior of the building so that the fastener can be opened and closed at will.

All of the sections of the building are interconnected and held together by similar or equivalent fastening elements. The location of those elements is shown in FIGS. 7, 8 and 9. Other fastening elements are located in corresponding positions on the walls opposite the walls shown in FIGS. 7 and 8, and on the other roof sections. For the sake of clarity, all of the hooks have been designated with the reference numeral 160 and all of the bail elements have been designated 162.

Integrity of the frame at the corners is maintained by avoiding joinder of two sections of tubing at the corner.

Instead, the corner is treated as shown in FIGS. 4 and 5. The rectangular portion of one side of the rectangular frame tube is cut out to form an opening of the same size and shape as the rectangular tubing in cross-section. The side walls are slotted at each end of the cutout. The slots are designated 164 in FIG. 4. Shallow slots 166 are formed at the other end of the cutout. An expansion tool is then inserted in the opening to spread the side walls below the cut away portion. Thereafter, the tubing is folded so that one portion of the rectangular tube, portion 168, is folded into the other portion of the tubing between the side wall 170 below the cutout. The finished construction is shown in FIG. 5, and it will be apparent that the lower, or outer, wall 172 of the tubing is continuous around the corner. There is a rivet at each side, one rivet 174 of which is visible in FIG. 5. Section 163 is joined to another section of tubing simply by being butted thereagainst. A wooden block 176 is press-fitted into section 168 and is held there by a screw 178. The exposed part of the wooden block is fitted into another section, not shown, so that the ends of that section and of section 168 are in abutment. The added section is secured to the block 176 with another screw.

Watertightness and airtightness at the vertical corners at which the side walls join one another is accomplished by extending the sheeting on some or all of the walls beyond the peripheral frame so that the extension will overlie the end uprights of others of the walls. In the preferred embodiment, the sheeting is made to extend beyond both of the end uprights of both walls of an opposed pair. In FIG. 8, the sheeting 110 has a portion 190 that extends beyond upright 44 and it has a portion 192 that extends beyond upright 42. Those extensions overlie the rearward faces of the end uprights 32 of side wall panel 30 and the unnumbered end upright of the side wall panel 12. A small hole at the upper and lower end of those side extensions accommodates a self-tapping metal screw that is employed in assembling and dissembling the building. The corresponding side extensions of the sheeting in the front wall panel are provided with similar holes.

When assembling the building, a front end panel can be made free-standing by opening the door so that it stands ajar. One side wall panel is then placed in position adjacent to the appropriate corner of the front end wall, and the two are interconnected by inserting self-tapping screws into the upper and lower holes of the sheeting extension of the front panel. While not shown in the drawing, matching pilot holes are formed in the end uprights of the side panels to facilitate connecting the two panels with self-tapping screws. That having been done, the other side wall is connected in like manner to the extension of the sheeting at the other side of the front end panel.

The two sections of the roof are then interconnected by connecting each of them to the several piano hinges, including hinge 80. The combined roof panels, folded one on the other, are then moved to the interior of the building where they fit easily if placed diagonally across the interior.

Thereafter, the other end section is assembled with the other side walls so that its peripheral frame will lie between the peripheral frames of the two side walls. While not essential, it is preferred that the side extensions of the sheeting of the rear panel wall be fastened by self-tapping screws to the end uprights of the side wall panel, as previously described.

That having been done, the several fastener elements, 160 and 162, are connected together by placing the bail portion over the hook portion and toggling them closed.

The next step is accomplished from the interior of the building. The roof sections are lifted above the side walls. They are oriented so that the ridge line extends parallel with the side walls and midway between them. That having been done, it remains only to spread apart the side edges of the two roof panels and to lower the roof so that its peripheral frame fits within the upper members of the peripheral frames of the several side walls. The roof is lowered until the portions of the roof sheeting that extend beyond its peripheral frame rest upon the upper side of the upper members of the peripheral frame of the several wall panels. The weight of the roof will tend to effect a sealing engagement between those upper wall members and the roof sheeting. That seal is improved and the members are brought into tight engagement with the sheeting by connecting the several fastening members 160 and 162 so that the roof is pulled down tight against the walls.

Although I have shown and described certain specific embodiments of my invention, I am fully aware that many modifications thereof are possible. My invention, therefore, is not to be restricted except insofar as is necessitated by the prior art.

I claim:
1. A portable building comprising:
 a pair of side wall panels and a pair of end wall panels;
 a roof comprising a pair of roof panels each having end edges and a lower edge and a ridge line edge, and means for interconnecting the roof panels at their ridge line edges;
 each of said end walls and said roof comprising members forming a peripheral frame covered by a sheeting;
 the peripheral frame of the roof having dimensions such that the whole of said frame fits within the upper ones of the frame members of said walls;
 the sheeting of the roof extending beyond its peripheral frame at the edges and the lower edges of its panel whereby said roof is supported on said wall panels by the portions of the sheeting that extend beyond the peripheral frame of the roof;
 the portions of the sheeting of said roof which extend beyond the frame members of its panels at their lower edges being formed of resilient material whereby the weight of said roof serves to press said portions of said sheeting against the upper frame members of said side walls in sealing engagement therewith;
 said roof and said side walls being interconnected by selectively interconnectable fastening elements each comprising a first part connected to, and accessible from, the interior side of a wall panel and a second part coonnected to, and accessible from, the lower side of said roof;
 said walls being interconnected by selectively interconnected fasteners each having a first part connected to, and accessible from, the inner side of a selected one of said walls and a second part connected to, and accessible from, the inner side of a wall adjacent to said selected one of said walls;
 the frame of each of said panels comprising lengths of rectangular tubing;
 said rectangular tubing being notched and bent at right angles to form corners of said frame in which the exterior surface is continuous around the corners;

sections of said rectangular tubing being interconnected by being abutted at adjacent ends, and comprising wooden plugs of size to make a pressed fit within said rectangular tubing, said plugs being inserted partly into the adjacent ends of said sections of rectangular tubing;

the portions of said sheeting of the roof extending beyond the frame of the roof being formed of resilient material whereby the weight of the roof serves to press said portions of said sheeting into sealing engagement with the upper members of said end walls and said side walls; and a ridge cap in the form of a strip of resilient material extending the length of the ridge edges of the roof panels and having inverted V-shape in cross-section, said ridge cap being fastened at one side of the V-shape to the upper surface of one roof panel such that said one side of the V-shape overlies said one roof panel and such that the other side of said V-shape overlies, and has sealing engagement with, the other roof panel;

the frame of at least one pair of said wall panels comprising cross members formed of rectangular tubing, the tubing of the peripheral frame of said one pair of said wall panels being formed with rectangular openings to receive the ends of said cross members and in which said ends of said cross members are disposed;

said cross members having like crosssectional dimensions, and in which one of said cross members is disposed perpendicularly to another of said cross members, said one of said cross members having juxtaposed, rectangular portions of opposite sides thereof cut away and the remaining sides thereof stretched to receive the other of said cross bars, said other of said cross bars extending through said one cross bar at said cut away portions.

* * * * *